US008861100B2

(12) United States Patent
Hirao et al.

(10) Patent No.: US 8,861,100 B2
(45) Date of Patent: Oct. 14, 2014

(54) IMAGING LENS

(75) Inventors: Tomomi Hirao, Chiba (JP); Tatsuya Fujiwara, Chiba (JP)

(73) Assignee: Seikoh Giken Co., Ltd., Chiba (JP)

( * ) Notice: Subject to any disclaimer, the term of this patent is extended or adjusted under 35 U.S.C. 154(b) by 57 days.

(21) Appl. No.: 13/605,438

(22) Filed: Sep. 6, 2012

(65) Prior Publication Data

US 2013/0063828 A1 Mar. 14, 2013

(30) Foreign Application Priority Data

Sep. 9, 2011 (JP) ................................. 2011-197245

(51) Int. Cl.
*G02B 13/00* (2006.01)
(52) U.S. Cl.
CPC .......... *G02B 13/006* (2013.01); *G02B 13/0015* (2013.01)
USPC ............................ 359/797; 359/716; 359/708
(58) Field of Classification Search
CPC .............. G02B 3/02; G02B 3/04; G02B 3/06; G02B 5/282; G02B 13/002; G02B 13/0025; G02B 13/003; G02B 13/004; G02B 13/0045; G02B 13/006; G02B 13/0015
USPC .......................................... 359/362, 642–830
See application file for complete search history.

(56) References Cited

U.S. PATENT DOCUMENTS

| 2009/0279188 | A1 | 11/2009 | Do |
| 2010/0046096 | A1 | 2/2010 | Hirao et al. |
| 2010/0188556 | A1 | 7/2010 | Hirao et al. |
| 2010/0188759 | A1* | 7/2010 | Sato et al. ..................... 359/793 |
| 2011/0267709 | A1 | 11/2011 | Hirao et al. |

FOREIGN PATENT DOCUMENTS

| CN | 101606095 B | 6/2011 |
| EP | 2 113 800 A1 | 11/2009 |
| JP | 3926380 B1 | 6/2007 |
| JP | 4293291 B2 | 7/2009 |
| JP | 2011-197623 A | 10/2011 |
| JP | 2011-203313 A | 10/2011 |
| JP | 2012-33042 A | 2/2012 |
| WO | 2008/102648 A1 | 8/2008 |
| WO | 2009/004966 A1 | 1/2009 |
| WO | 2011/055623 A1 | 5/2011 |

* cited by examiner

*Primary Examiner* — Darryl J Collins
*Assistant Examiner* — Gary O'Neill
(74) *Attorney, Agent, or Firm* — Kenealy Vaidya LLP

(57) ABSTRACT

A junction type compound lens using glass and resin is used. By properly controlling the difference between refractive indices and the difference between Abbe numbers of the resin and glass, interface reflection that occurs when a ray with a large incidence angle is incident is restricted, and generation of a flare or a ghost image is restricted. Further, by properly controlling the difference in refractive index and the difference in Abbe number, various aberrations, such as spherical aberration, field curvature, and chromatic aberration, which may deteriorate optical performance, can be corrected. Thus, a small and high-performance imaging lens can be provided.

4 Claims, 15 Drawing Sheets

FIG. 5A

| SURFACE NUMBER | CORRESPONDING SURFACE | CURVATURE RADIUS | SURFACE SPACING | REFRACTIVE INDEX | ABBE NUMBER |
|---|---|---|---|---|---|
| 1 | S1 | ∞ | 0 | | |
| 2 | S2 | 0.714 | 0.096 | 1.513 | 53 |
| 3 | S3 S4 | ∞ | 0.6 | 1.568 | 55.98 |
| 4 | S5 S6 | ∞ | 0.15 | 1.602 | 28 |
| 5 | S7 | −2.548 | 0.2 | | |
| 6 | S8 | ∞ | 0.3 | 1.5168 | 64.16 |
| 9 | S9 | ∞ | 0.313 | | |
| 10 | S10 | ∞ | | | |

FIG. 5B

| | S2 | S7 |
|---|---|---|
| k | −1.141E−01 | 0.000E+00 |
| $A_0$ | −2.000E+00 | 1.426E+00 |
| $B_0$ | 8.359E+01 | −6.366E+00 |
| $C_0$ | −1.711E+03 | 5.316E+01 |
| $D_0$ | 1.390E+04 | −1.282E+02 |

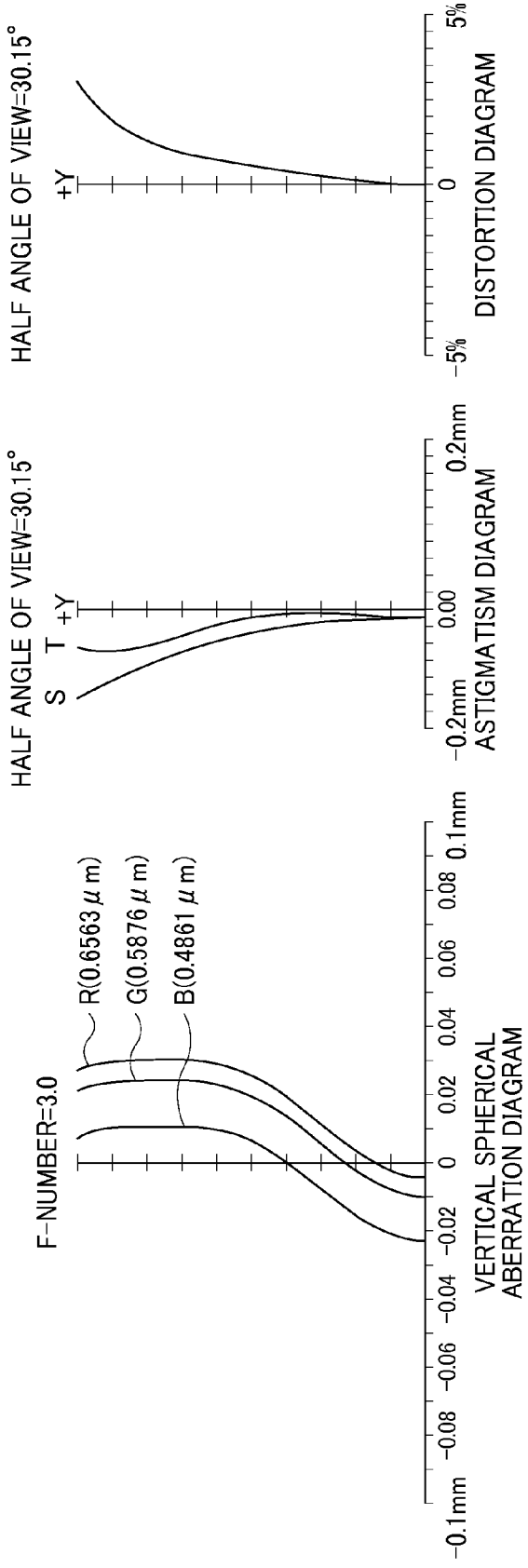

FIG. 8A

| SURFACE NUMBER | CORRESPONDING SURFACE | CURVATURE RADIUS | SURFACE SPACING | REFRACTIVE INDEX | ABBE NUMBER |
|---|---|---|---|---|---|
| 1 | S1 | ∞ | | | |
| | | | −0.062 | | |
| 2 | S2 | 0.471 | | | |
| | | | 0.108 | 1.513 | 53 |
| 3 | S3 S4 | ∞ | | | |
| | | | 0.232 | 1.568 | 55.98 |
| 4 | S5 S6 | ∞ | | | |
| | | | 0.031 | 1.602 | 28 |
| 5 | S7 | 0.967 | | | |
| | | | 0.31 | | |
| 6 | S8 | 10.843 | | | |
| | | | 0.447 | 1.51 | 56 |
| 7 | S9 | 33.27 | | | |
| | | | 0.05 | | |
| 8 | S10 | ∞ | | | |
| | | | 0.3 | 1.5168 | 64.16 |
| 9 | S11 | ∞ | | | |
| | | | 0.3 | | |
| 10 | S12 | ∞ | | | |

FIG. 8B

| | S2 | S7 | S8 | S9 |
|---|---|---|---|---|
| k | −1.270E−01 | 0.000E+00 | −2.780E+00 | 4.500E+01 |
| $A_0$ | 8.029E−02 | 1.408E+00 | −1.040E+00 | 1.880E−01 |
| $B_0$ | 4.882E+00 | 1.102E+01 | −1.590E+01 | −5.146E+00 |
| $C_0$ | −1.700E+01 | −1.073E+02 | 1.438E+02 | 1.353E+01 |
| $D_0$ | 6.673E+01 | 2.033E+03 | −7.473E+02 | −1.936E+01 |

FIG. 12A

| SURFACE NUMBER | CORRESPONDING SURFACE | CURVATURE RADIUS | SURFACE SPACING | REFRACTIVE INDEX | ABBE NUMBER |
|---|---|---|---|---|---|
| 1 | S1 | ∞ | | | |
| | | | −0.2 | | |
| 2 | S2 | 1.036 | | | |
| | | | 0.26 | 1.513 | 53 |
| 3 | S3 S4 | ∞ | | | |
| | | | 0.15 | 1.568 | 55.98 |
| 4 | S5 S6 | ∞ | | | |
| | | | 0.05 | 1.625 | 23.5 |
| 5 | S7 | 3.903 | | | |
| | | | 0.607 | | |
| 6 | S8 | −1.219 | | | |
| | | | 0.44 | 1.602 | 28 |
| 7 | S9 | −2.125 | | | |
| | | | 0.451 | | |
| 8 | S10 | 1.797 | | | |
| | | | 0.3 | 1.47 | 54.7 |
| 9 | S11 S12 | ∞ | | | |
| | | | 0.65 | 1.5168 | 64.16 |
| 10 | S13 S14 | ∞ | | | |
| | | | 0.2 | 1.526 | 54 |
| 11 | S15 | 1.802 | | | |
| | | | 0.25 | | |
| 12 | S16 | ∞ | | | |
| | | | 0.3 | 1.5168 | 64.16 |
| 13 | S17 | ∞ | | | |
| | | | 0.443 | | |
| 14 | S18 | ∞ | | | |

FIG. 12B

| | S2 | S7 | S8 | S9 | S10 | S15 |
|---|---|---|---|---|---|---|
| k | −3.521E−01 | 1.330E+00 | 2.196E+00 | 2.988E+00 | −1.113E+01 | −5.678E+00 |
| $A_0$ | 6.900E−02 | 4.314E−02 | −2.070E−01 | −3.142E−01 | −1.900E−01 | −7.551E−02 |
| $B_0$ | 1.471E−01 | 2.234E−02 | 6.414E−01 | 5.397E−01 | 1.181E−01 | 1.870E−02 |
| $C_0$ | −1.575E−01 | 7.477E−02 | −8.925E−01 | −3.142E−01 | −3.488E−02 | −3.489E−03 |
| $D_0$ | 4.771E−01 | −2.262E−02 | 1.526E+00 | 2.000E−01 | 4.344E−03 | 2.552E−04 |

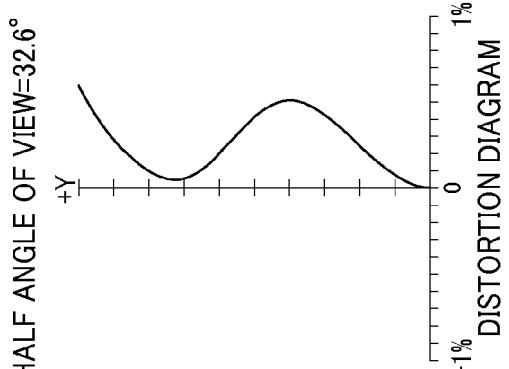
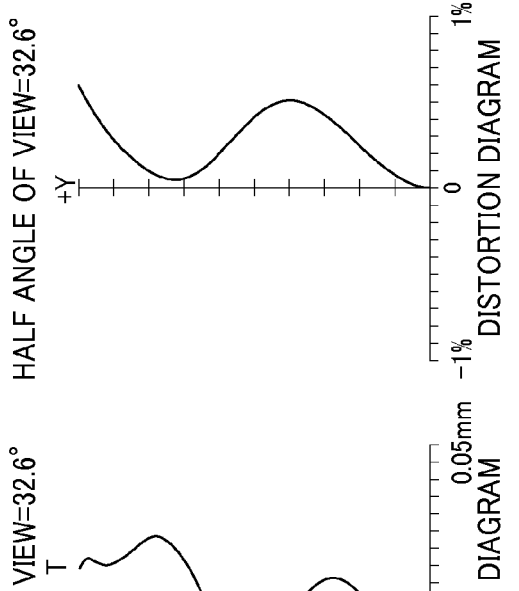
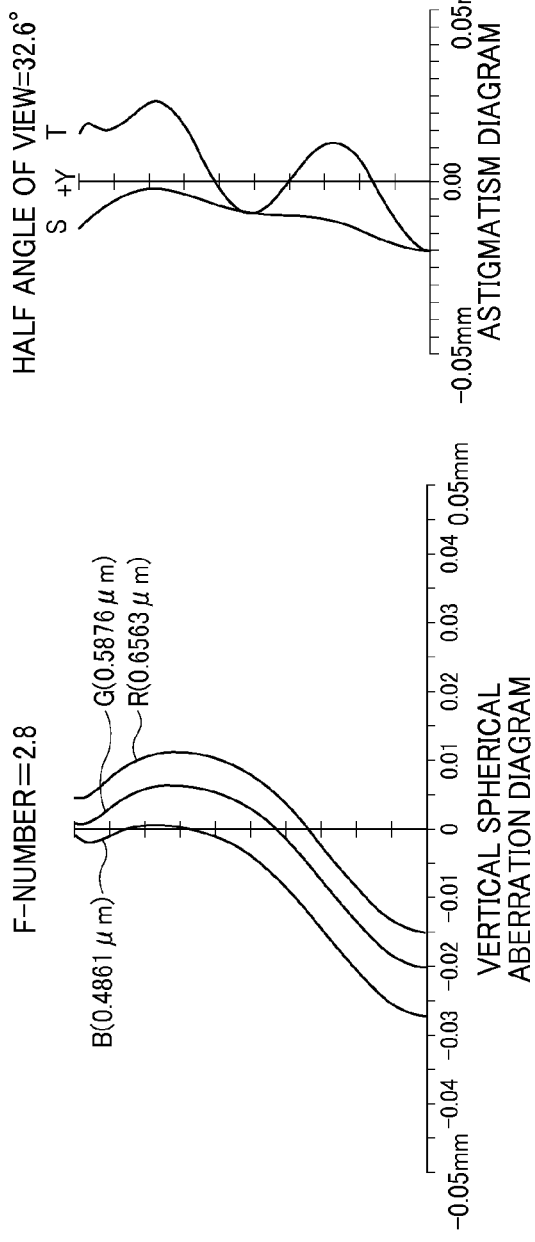

FIG. 15

|  | EXAMPLE 1 | EXAMPLE 2 | EXAMPLE 3 | |
| --- | --- | --- | --- | --- |
|  | HL1 | HL1 | HL1 | HL2 |
| EXPRESSION (2) | 0.089 | 0.089 | 0.112 | 0.056 |
| EXPRESSION (3) | 0.055 | 0.055 | 0.055 | 0.0468 |
| EXPRESSION (4) | 0.034 | 0.034 | 0.057 | 0.0092 |
| EXPRESSION (5) | 2.98 | 2.98 | 2.98 | 9.46 |
| EXPRESSION (6) | 27.98 | 27.98 | 32.48 | 10.16 |
| EXPRESSION (7) |  | 25 | 29.5 |  |

IMAGING LENS

CROSS-REFERENCE TO RELATED APPLICATIONS

This application claims priority from Japanese Patent Application No. 2011-197245, filed on Sep. 9, 2011, the entire subject matter of which is incorporated herein by reference.

BACKGROUND OF THE INVENTION

1. Field of the Invention

The present invention relates to an imaging lens for a small imaging apparatus using a solid-state image sensing element, such as an image sensing element of a charge-coupled device (CCD) type or a complementary mental-oxide semiconductor (CMOS) type.

2. Description of the Related Art

In many cases, an imaging lens used for a cellular phone or the like has been manufactured by injection molding with thermoplastic resin in view of mass production and cost. Also, in recent years, to simplify the manufacturing process and to reduce the cost, a lens module has been required to resist a reflow process. In particular, an imaging lens that resists a solder reflow process has been demanded. There is such a demand; however, a thermoplastic resin lens cannot resist the temperature of the solder reflow process. Hence, a heat-resistant imaging lens formed by various methods is being gradually suggested.

Japanese Patent No. 3926380 discloses, as an example of a highly heat-resistant lens, a junction type compound lens that is one type of hybrid lens in which optical glass is combined with heat-resistant UV-curable resin or thermosetting resin. The junction type compound lens addresses the problem of heat resistance and also the problem of interface reflection of the junction type compound lens by controlling the difference between refractive indices of the glass and the resin material to be a constant value or smaller.

Further, in order to reduce chromatic aberration without using a diffraction surface, Japanese Patent No. 4293291 discloses a method of constituting a junction type compound lens by controlling Abbe numbers of lenses that are formed on both surfaces of a transparent plane parallel plate to be a predetermined value.

As described above, the junction type compound lens is gradually being used in a situation with a difficulty in application of a resin lens, such as when the lens is subjected to, for example, solder reflowing, by combining heat-resistant energy-curable resin with glass.

A glass lens is not changed in shape or deteriorated in performance at the temperature of the solder reflow process. However, it is known that, if an aspherical lens is formed of a glass material, the aspherical lens which is frequently used for reducing various aberrations, the cost may become very high. If an aspherical lens is to be formed of glass, a method called aspherical-surface glass molding is widely performed as a method available for mass production. This method manufactures an aspherical glass lens by using a low-melting-point glass and a die; however, the cost of this method is higher than the cost of a plastic lens obtained by a conventional injection molding method or a junction type compound lens that uses glass and curable resin. In the glass molding method, a precise preform, the volume of which is controlled and the shape of which is relatively close to a final aspherical surface shape, is set on a die that is heated at a deformation point of glass or higher, the preform is pressed by another die, and hence an aspherical surface is formed on both surfaces or one surface. The precise preform with the controlled volume is expensive, and the life of the dies that are exposed to the high temperature is short. For the mass production, multiple dies have to be prepared. Owing to this, it is difficult to supply lenses with a low cost.

Since the aspherical surface portion of the junction type compound lens is formed of the curable resin, the degree of freedom of the shape is high. Also, the temperature of a die is around a room temperature if UV-curable resin is used, and the temperature of a die is about 200° C. if thermosetting resin is used. Hence, the process is at a temperature that is markedly lower than 400° C. or higher of the temperature of the step in the glass molding method. Therefore, the life of the die is long. In addition, the process time is from about several seconds to about two minutes in case of the UV-curable resin, and is from about one to about ten minutes in case of the thermosetting resin. Hence, a tact time (a cycle time) is shorter than that of the glass molding method. Further, the heat-resistant UV-curable resin and thermosetting resin are generally expensive. In contrast, since the junction type compound lens uses a spherical glass or a plane parallel glass plate, the volume of resin to be used is small. Therefore, with the junction type compound lens, a heat-resistant lens that can resist the temperature of the solder reflowing can be provided with a low cost.

Meanwhile, it is known that reflection occurs at interfaces between the glass and resin of the junction type compound lens in accordance with the difference between the refractive indices of the glass and resin. For example, in case of a junction type compound lens using a resin with a refractive index of 1.4 and a glass with a refractive index of 1.6, when a ray is perpendicularly incident on the interfaces, the ray is reflected at the interfaces by 0.44%. The reflection ray is not intended by the design, and if the ray is reflected a plurality of times and then is incident on an image sensing element, the ray may result in a defect, such as a flare that causes reduction in contrast, or formation of a ghost image that is visually recognized as vivid light dots or light lines. To restrict the interface reflection, it is effective to control the difference between the refractive indices of the glass and resin to be within 0.1. However, if a ray is incident at an angle, a reflection characteristic when the ray is incident from a high-refractive-index medium on a low-refractive-index medium is different from a refraction characteristic when the ray is incident from the low-refractive-index medium on the high-refractive-index medium. If the ray is incident from the high-refractive-index medium on the low-refractive-index medium at an angle larger than the critical angle, the ray is not refracted but totally reflected. In contrast, if the ray is incident from the low-refractive-index medium on the high-refractive-index medium, the critical angle is not present, and hence the total reflection does not occur. That is, in order to restrict the reflection at the interfaces, the condition that the difference in refractive index is set within 0.1 is not sufficient.

Further, if the difference between the Abbe numbers of the resins used for the junction type compound lens is increased, the chromatic aberration is effectively corrected. However, it is known that the relationship between the refractive index and the Abbe number of resin generally has a linear relationship. If the difference in Abbe number is increased to correct the chromatic aberration, the difference between the refractive indices of the two resins is increased. If the difference between the refractive indices is increased, the reflection at the interfaces between the glass and resin is increased as described above, and an optical defect, such as a flare or a ghost image, is generated. Therefore, focusing only on the Abbe number to correct the chromatic aberration is insufficient for the technique of increasing optical performance.

SUMMARY OF THE INVENTION

The present invention is made to address the problems, and provides an imaging lens that can restrict interface reflection and sufficiently correct various aberrations.

To address the above-described problems, according to an aspect of the present invention, there is provided an imaging lens including at least one lens unit. The lens unit includes a junction type compound lens having a plane parallel glass plate formed of optical glass; an object side resin lens formed of energy-curable resin, bonded to an object side surface of the plane parallel glass plate and being a planoconvex lens with a convex surface facing the object side having a positive refractive power; and an image side resin lens formed of energy-curable resin, bonded to an image side surface of the plane parallel glass plate and being a planoconcave lens with a concave surface facing the image side having a negative refractive power. The imaging lens satisfies Expressions (1) to (8) as follows, $$N_1 \leq N_2 \leq N_3 \quad (1),$$

$$0.08 \leq N_3 - N_1 \leq 0.15 \quad (2)$$

$$0 \leq N_2 - N_1 \leq 0.1 \quad (3),$$

$$0 \leq N_3 - N2 \leq 0.1 \quad (4),$$

$$|\upsilon 1 - \upsilon 2| \leq 30 \quad (5),$$

$$|\upsilon 2 - \upsilon 3| \leq 32.48 \quad (6),$$

$$29.5 \leq \upsilon 1 - \upsilon 3 \leq 40 \quad (7), \text{ and}$$

$$\upsilon 2 \geq 50 \quad (8),$$

where $N_1$ is a refractive index of the object side resin lens, $N_2$ is a refractive index of the plane parallel glass plate, $N_3$ is a refractive index of the image side resin lens, $\upsilon_1$ is an Abbe number of the object side resin lens, $\upsilon_2$ is an Abbe number of the plane parallel glass plate, and $\upsilon_3$ is an Abbe number of the image side resin lens.

FIG. 1 shows a change in reflectivity at interfaces in accordance with an incidence angle of a ray when the ray is incident from a high-refractive-index medium on a low-refractive-index medium. FIG. 2 shows a change in reflectivity at interfaces in accordance with an incidence angle of a ray when the ray is incident from the low-refractive-index medium on the high-refractive-index medium. In FIGS. 1 and 2, for example, calculation is made when the low-refractive-index medium uses a material with a refractive index of 1.5 and the high-refractive-index medium uses a material with a refractive index of 1.6. Comparing FIG. 1 with FIG. 2, the difference in refractive index is 0.1 in either of FIGS. 1 and 2. However, if a ray at an angle is incident, the reflectivity reaches 10% when the incidence angle is 65°, and the reflectivity becomes 100% when the incidence angle is 70° in FIG. 1. In contrast, the reflectivity is about 10% when the incidence angle is 70° in FIG. 2. Thus, although the difference does not appear when the ray is perpendicularly incident, for an incident ray with an angle, the ray advancing from the low-refractive-index medium to the high-refractive-index medium has a lower reflectivity at any angle as compared with the reflectivity of the ray when the ray advances from the high-refractive-index medium to the low-refractive-index medium. S-polarized light shown in FIGS. 1 and 2 is light that vibrates in a direction parallel to the incidence surface, and P-polarized light shown in FIGS. 1 and 2 is light that vibrates in a direction perpendicular to the incidence surface.

Further, if Expression (2) is satisfied, the refractive index of the image side resin lens can be increased. If the refractive index can be increased, the value of the curvature radius can be increased with the same refractive power of the lens. Also, since the difference in refractive index is increased, in case of an imaging lens unit having a constitution of two or more units including the junction type compound lens according to the aspect of the present invention, spherical aberration and field curvature can be efficiently corrected. For example, if a junction type compound lens satisfies Expressions (1) and (2), and is constituted by an object side lens having a positive refractive power and an image side lens having a negative refractive power, the constitution is advantageous for the correction of the spherical aberration. If a junction type compound lens satisfies Expressions (1) and (2), and is constituted by an object side lens having a negative refractive power and an image side lens having a positive refractive power, the constitution is advantageous for the correction of the field curvature.

These expressions are defined by media that are adjacent to each other. Since the plane parallel glass plate is arranged in the middle and the object side resin lens does not directly contact the image side resin lens, if the refractive indices of the plane parallel glass plate and resins are controlled with Expressions (1) to (6), the refractive index of the image side resin lens can be increased by up to 0.2 as compared with the refractive index of the object side resin lens. The aberration can be corrected by using the high-refractive-index material. In contrast, if the difference in refractive index is smaller than 0.05, the effect of the correction for aberration is reduced.

The one-unit lens is described for the convenience of description. However, as long as the imaging lens is formed of at least two lenses and includes at least the one-unit junction type compound lens according to the aspect of the present invention, the advantage can be provided. Hence, the number of lenses is not particularly limited to the number of lenses provided in the aspect of the present invention.

The energy-curable resin used here is a material, the cross-linking reaction or polymerizing reaction of which progresses when the material receives external energy. The external energy may be, for example, heat, an ultraviolet (UV) ray, or an electron beam. The type of such an energy-curable resin may be thermosetting type, UV-curable type, or electron-curable type depending on the energy type. The type of the material may be typically silicone-based type, epoxy-based type, or acryl-based type. There are various types of the energy-curable resin as mentioned above; however, any energy-curable resin may be used as a resin lens material in the aspect of the present invention as long as the resin is sufficiently optically transparent. The limitation of being transparent represents that the material exhibits a small optical absorption and a small scattering by certain degree to be used within a predetermined wavelength range.

The chromatic aberration is generated because a light-collecting point varies in accordance with a wavelength. The degree of aberration depends on color dispersion of a material to be used. As long as color dispersion has a limited value, the chromatic aberration cannot be theoretically removed with a single material. However, if materials with different color dispersions are combined and lenses have curved surfaces with optimal shapes, the chromatic aberration can be efficiently corrected. The color dispersion is specific to the material, and the reciprocal of the color dispersion is the Abbe number. A frequently used method of correcting the chromatic aberration is forming a lens with a light-collecting effect by using a material with a large Abbe number, i.e., a material with a small color dispersion; forming a lens with a light-dispersing effect by using a material with a small Abbe number, i.e., a material with a large color dispersion; and hence canceling the generated positive and negative chromatic aberrations with each other.

According to the aspect of the present invention, since the joint portions between the glass and resin are flat surfaces, the lenses arranged at the object side and the image side each are a planoconvex lens or a planoconcave lens. Expressions (1), and (3) to (6) provides limitations for the refractive indices and the Abbe numbers of the resin lenses and the plane parallel glass plate to restrict the interface reflection. Hence, the resin lenses and the plane parallel glass plate are arranged so that the refractive index increases from the object side to the image side. The Abbe number and the refractive index have a linear relationship. In particular, the resin material does not exhibit anomalous dispersion. Hence the larger the refractive index, the smaller the Abbe number. Therefore, according to the aspect of the present invention, to satisfy Expression (7), the object side lens has to be constituted by a material with a small refractive index, i.e., a material with a large Abbe number; and the image side lens has to be constituted by a material with a large refractive index, i.e., a material with a small Abbe number. A material with a large Abbe number has to have a positive refractive power for the principle of achromatism. Hence, the object side resin lens is a planoconvex lens with a convex surface facing the object side. Also, a material with a small Abbe number has to have a negative refractive power. Hence, the image side resin lens is a planoconcave lens with a concave surface facing the image side. The thus-constituted junction type compound lens is a meniscus lens with a convex surface facing the object side, and is effectively used for a lens located at the most front in the imaging lens with at least two units.

If the difference in Abbe number is equal to or larger than the lower limit of Expression (7), the chromatic aberration can be efficiently corrected. The difference in Abbe number has the upper limit because if resin materials exceeding the upper limit are selected, the difference between the refractive indices of the glass and resin exceeds the upper limits of Expressions (2) and (3). Hence, the interface reflection is increased, and the interface reflection cannot be restricted although the restriction of the interface refraction is the major advantage of the aspect of the present invention.

Also, Expression (8) is a condition for the Abbe number of the plane parallel glass plate. According to the aspect of the present invention, the chromatic aberration is corrected by the two types of resin lenses arranged with the plane parallel glass plate interposed therebetween. Since both surfaces of the plane parallel glass plate are flat surfaces, the plane parallel glass plate does not have a refractive power. However, the distance by which each incident ray passes through the glass medium varies in accordance with an incidence angle. Hence, if a material with a small color dispersion, i.e., a material with a large Abbe number satisfying Expression (8) is used, the effect of the correction for chromatic aberration can be maintained. If the value is smaller than the lower limit of this expression, even if the two types of resin materials correct the chromatic aberration, the correction is insufficient and the chromatic aberration remains. Thus, the optical performance is deteriorated.

Expression (2) is a condition that controls the difference between the refractive indices of the object side resin lens and the image side resin lens. As described above, according to the aspect of the present invention, since the difference in refractive index is increased, a resin material with a large refractive index can be used for the image side resin lens. In particular, the image side resin lens is determined to have a negative refractive power for the correction of chromatic aberration. As described above, since the surface of the image side resin lens contacting the glass is a flat surface, in order to have a negative refractive power, the shape of the surface contacting the air is a concave surface. Also, the object side resin lens has a convex surface. With the lens unit having such shapes, if the difference between refractive indices of the convex surface and the concave surface is large, the spherical aberration can be effectively corrected. Also, the combination of lenses for effectively decreasing the Petzval sum and decreasing the field curvature is a convex surface of a high-refractive-index material and a concave surface of a low-refractive-index material. The aforementioned combination of lens shapes is disadvantageous. As long as the combination with the difference in refractive index is within the condition of Expression (2), the spherical aberration and the field curvature can be corrected in a well balanced manner. That is, if the value is equal to or smaller than the lower limit of Expression (2), the spherical aberration cannot be effectively corrected. If the value is equal to or larger than the upper limit of Expression (2), the Petzval sum is increased, and it is difficult to reduce the field curvature.

If the plane parallel glass plate used for the lens unit is an individual piece of glass cut before the resin lenses are formed, the junction type compound lens can be manufactured by using a thin glass plate. In case of a wafer-scale lens, lenses are collectively formed on a glass wafer with a size of several inches. Hence, the glass may be broken or warped due to contraction when the UV-curable resin or thermosetting resin is cured. It is known that a typical contraction ratio when the UV-curable resin or the thermosetting resin is cured is 2%, and if the contraction ratio is large, the contraction ratio may be from 10% to 15%. If a single lens is formed on an individual piece of glass, since the amount of resin is very small, a stress caused by contraction of curing to the glass is small. With reference to experimentally obtained numerical values, a junction type compound lens using an individual piece of glass can constitute a lens unit even if the piece of glass has a thickness of 0.1 mm. In contrast, in case of the wafer-scale lens, the thickness of the plane parallel glass plate is about 0.3 mm at the minimum. Thus, the thickness of the lens can be thin if the individual piece of glass is used. An imaging lens can be reduced in size and height while a back focus sufficient for insertion of a filter component or the like is secured.

If the resin lenses in the lens unit have curved surfaces that are aspherical surfaces, the aberration can be efficiently corrected by a small number of lenses, and hence a high-performance imaging lens can be provided.

With the imaging lens according to the aspect of the present invention, when the resin lens having the aspherical surface is formed on the plane parallel glass plate, a die with an aspherical surface can be used. The die with the aspherical surface can be processed by using a high-precision aspherical-surface processing device. For a plastic lens using injection molding, and also for a glass mold method using a low-melting-point glass, the die with the aspherical surface is used if the aspherical surface is formed. The junction type compound lens according to the aspect of the present invention similarly uses the die, and hence a high-precision aspherical lens can be formed.

An evaporated film for shielding a ray with a specific wavelength may be formed on at least one of the surfaces of the plane parallel glass plate.

The CCD image sensing element or the CMOS image sensing element used for the imaging lens has sensitivity in a range other than a visible light range. For example, if an infrared ray is directly incident on the image sensor, it is known that the image quality is deteriorated. Hence, to cut the not-required infrared ray, an infrared cut filter is inserted into the lens unit. According to the aspect of the present invention, since the film that cuts the infrared ray can be evaporated on one of the surfaces of the plane parallel glass plate that is used for the junction type compound lens, the infrared cut filter component does not have to be additionally prepared. Further, since the filter component is omitted, the height can be reduced.

An optical thin film, such as an antireflection film or an infrared cut film, reflects or prevents reflection of a ray with a specific wavelength or rays in a wavelength range by using the principle of interference. Hence, such an optical thin film may be provided between the plane parallel glass plate and the energy-curable resin according to the aspect of the present invention without any problem on practical use.

With the imaging lens according to the aspect of the present invention, by using the junction type compound lens using the glass and resin and by properly controlling the refractive indices of the resin and glass, various aberrations, which may deteriorate optical performance, can be corrected while interface reflection when a ray is incident at a large incidence angle is restricted. Thus, a small and high-performance lens system can be provided.

BRIEF DESCRIPTION OF THE DRAWINGS

FIGS. 5A and 5B show optical design data of Example 1;

FIGS. 6A to 6C provide aberration diagrams of vertical spherical aberration, astigmatism, and distortion of Example 1;

FIGS. 8A and 8B show optical design data of Example 2;

FIGS. 12A and 12B show optical design data of Example 3;

FIGS. 13A to 13C are aberration diagrams of vertical spherical aberration, astigmatism, and distortion of Example 3;

FIG. 15 shows values of Expressions (2) to (8) according to Examples 1 to 3.

DESCRIPTION OF THE PREFERRED EMBODIMENT

An embodiment of the present invention is described with reference to the drawings. The drawings illustrate constitution examples according to the embodiment of the present invention, and merely schematically show cross-sectional shapes and arrangement of components by certain degree for understanding the present invention. Hence, the present invention is not limited to the illustrated examples. Also, specific conditions etc. are occasionally provided in the following description; however, the materials and conditions are merely preferred examples. Hence, the present invention is not limited to the provided examples.

Figure 1:
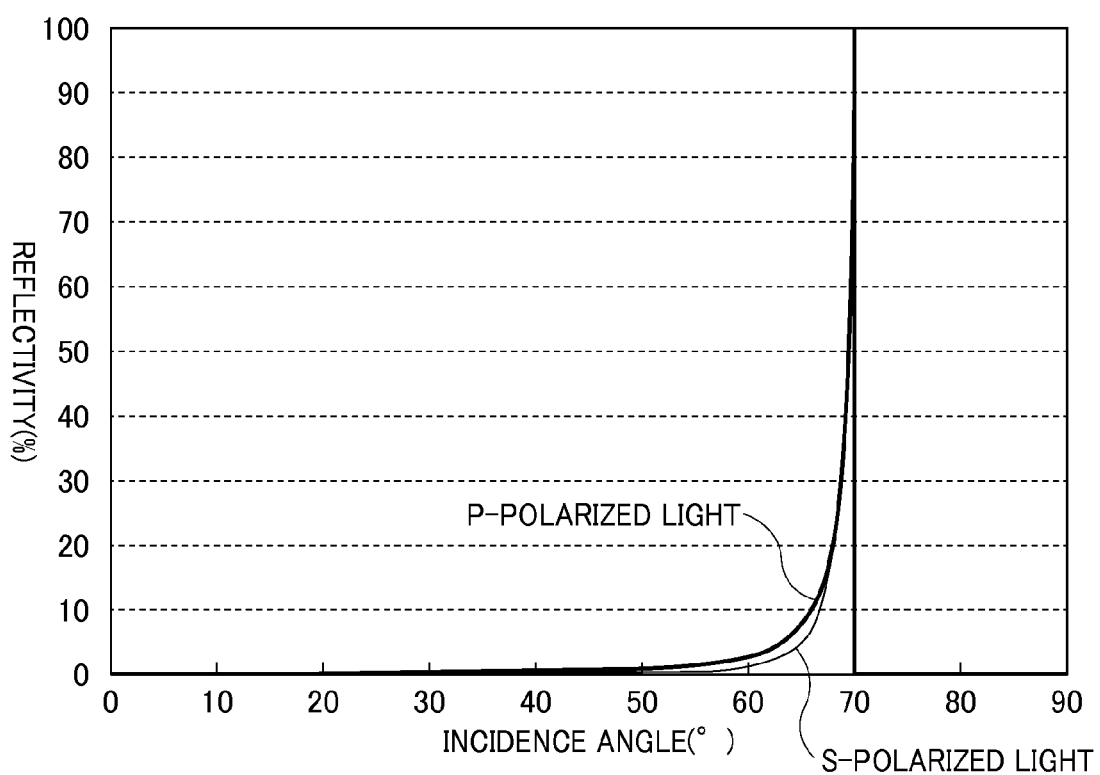
FIG. 1 illustrates the relationship between the angle and the reflectivity of a ray incident from a high-refractive-index material on a low-refractive-index material.
Figure 2:
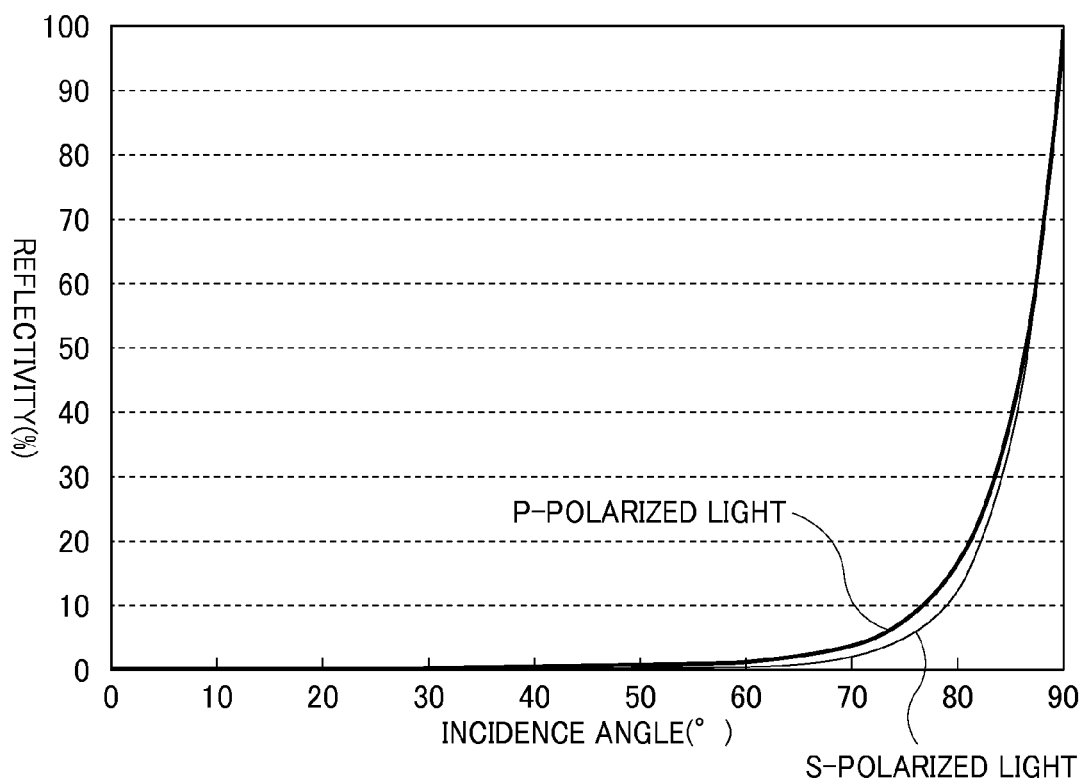
FIG. 2 illustrates the relationship between the angle and the reflectivity of a ray incident from the low-refractive-index material on the high-refractive-index material.
Figure 3:
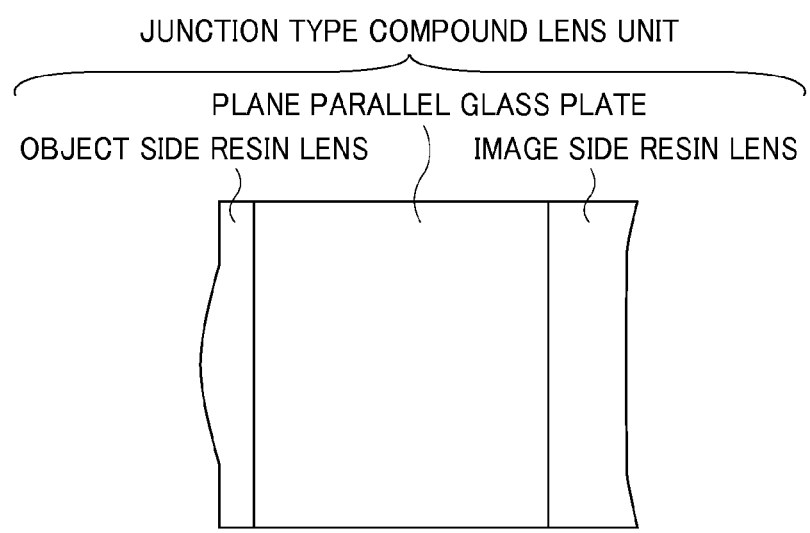
FIG. 3 is a cross-sectional view of a structure of a junction type compound lens according to an embodiment of the present invention.

FIG. 3 is a constitution diagram of an imaging lens according to the embodiment of the present invention. An object side resin lens and an image side resin lens formed of energy-curable resin are respectively bonded to both surfaces of a plane parallel glass plate.

In the following drawings, when it is assumed that a light ray incidence side is an object side and an image formation side is an image side with respect to the lens unit, a first object side lens that constitutes a junction type compound lens unit when viewed from the object side is a first resin lens L1, and numbers are successively assigned to other following lenses bonded to the plane parallel glass plate. For example, in FIG. 3, the object side lens is the first resin lens L1, and the image side lens is a second resin lens L2. Also, plane parallel glass plates are expressed by successively assigning numbers after alphabetical characters. For example, a plane parallel glass plate to which the first resin lens when viewed from the object side is bonded is a first plane parallel glass plate G1, and a second plane parallel glass plate is a second plane parallel glass plate G2. Thus, L5 is a fifth resin lens bonded to a plane parallel plate when counted from the object side. G3 is a third plane parallel glass plate when counted from the object side. Further, junction type compound lenses each constituted by a plane parallel glass plate and resin lenses bonded to the plane parallel glass plate are expressed by successively assigning numbers in accordance with the count from the object side such that a first junction type compound lens unit when viewed from the object side is a first junction type compound lens unit HL1. That is, a second junction type compound lens unit when viewed from the object side is a second junction type compound lens unit HL2. Further, a lens formed of a single material is recognized as a single lens, and is discriminated from the junction type compound lens for the convenience of description. Single lenses are also expressed by successively assigning numbers, such as a first single lens ML1 and a second single lens ML2.

Also, a reference sign Si indicative of each surface in the drawings is expressed such that S1 is a first surface when viewed from the object side, and the number is incremented by one toward the image side. It is to be noted that a flat surface of a resin lens is a surface different from a joint surface of a plane parallel glass plate. That is, in case of FIG. 3, a flat surface of the first resin lens L1 is S2 and a surface of the first plane parallel glass plate G1 that is in contact with the first resin lens L1 is S3. Symbols and reference signs provided hereinafter are assigned under the above-described rules.

Example 1

Figure 4:
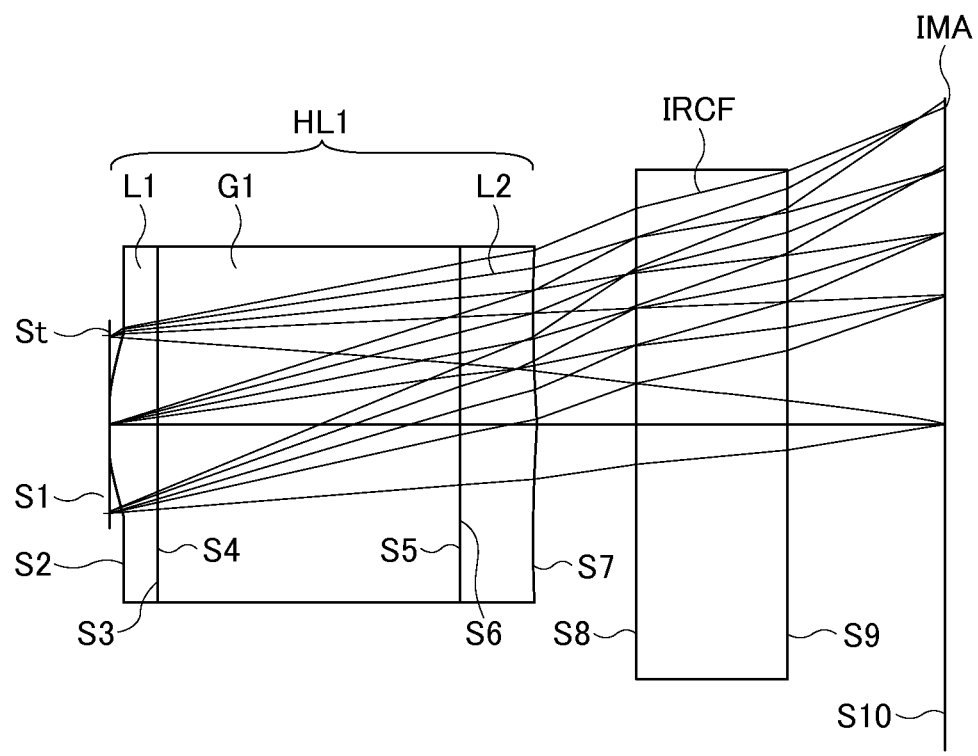
FIG. 4 is an optical path diagram of an imaging lens unit according to Example 1.

FIG. 4 is a constitution diagram of a lens unit according to Example 1. An aperture stop St being an only diaphragm that determines an entrance pupil; a first junction type compound lens unit HL1 being constituted of a first resin lens L1, a first plane parallel glass plate G1, and a second resin lens L2; an infrared cut filter IRCF that shields excessive infrared rays; and an image sensing element IMA are successively arranged in that order from the object side. The joint surfaces of the glass and resin are treated with silane coupling for increasing the contact strength at the interfaces between the glass and resin. A silane coupling agent is a material that can be coupled with both the resin and glass, and is widely used for increasing the contact strength at the interfaces between the glass and resin.

Also, FIGS. 5A and 5B show design data of this example.

The lens data of this example showed in FIGS. 5A and 5B are as below:
FOCAL LENGTH f=1.162 mm
LENS TOTAL LENGTH TL=1.659 mm
F-NUMBER F=3.0
SENSOR DIAGONAL LENGTH IH=1.4 mm
DIAGONAL ANGLE OF VIEW(FOV)=60.3°

The refractive index uses values based on the wavelength of the d-line. The focal length f uses a value based on the d-line. The lens total length TL is a distance calculated from an object side surface of the first resin lens to an image sensing element surface along the optical axis. The F-number F is a value indicative of brightness of the imaging lens. The sensor diagonal length IH is a diagonal length of the image sensing element. The diagonal angle of view FOV is an imaging angle at the object side at which the lens unit can perform imaging when the image sensing element with the diagonal length IH is used. Also, a flat surface is expressed to have a curvature ∞.

An aspherical surface used in the embodiment and examples of the present invention is given by Expression (10) as follows:

$$Z = \frac{ch^2}{1+\sqrt{1-(1+k)c^2h^2}} + A_0 h^4 + B_0 h^6 + C_0 h^8 + D_0 h^{10} \cdots, \quad (10)$$

Where Z is a depth from a contact surface to the vertex of the surface, C is a curvature on the optical axis of a surface, h is a height from the optical axis, k is a conic constant, $A_0$ is an aspherical surface coefficient of degree 4, $B_0$ is an aspherical surface coefficient of degree 6, $C_0$ is an aspherical surface coefficient of degree 8, and $D_0$ is an aspherical surface coefficient of degree 10.

In FIGS. 5A, 5B, 8A, 8B, 12A and 12B, numerical values representing aspherical surface coefficients are indicated by exponents. For example, "E−1" represents the "10 to the minus 1$^{st}$ power"

In this example, the first resin lens L1 uses a UV-curable resin with a refractive index of 1.513 and an Abbe number of 53, the second resin lens L2 uses a UV-curable resin with a refractive index of 1.602 and an Abbe number of 28, and the plane parallel glass plate G1 uses N-BAK4 with a refractive index of 1.568 and an Abbe number of 55.98 manufactured by SHOTT AG. The resin lenses and the plane parallel glass plate are arranged so that the refractive index successively increases from the object side, and satisfy Expressions (1) to (6) and (8) (see FIG. 15).

FIGS. 6A to 6C provide aberration diagrams of vertical spherical aberration, astigmatism, and distortion of this example. The spherical aberration in the entrance pupil is within 0.1 mm, the astigmatism in the imaging angle of view is within 0.2 mm, and the distortion is within 4%. Hence, it is found that the aberrations are sufficiently corrected as a lens constituted by a single unit.

Example 2

Figure 7:
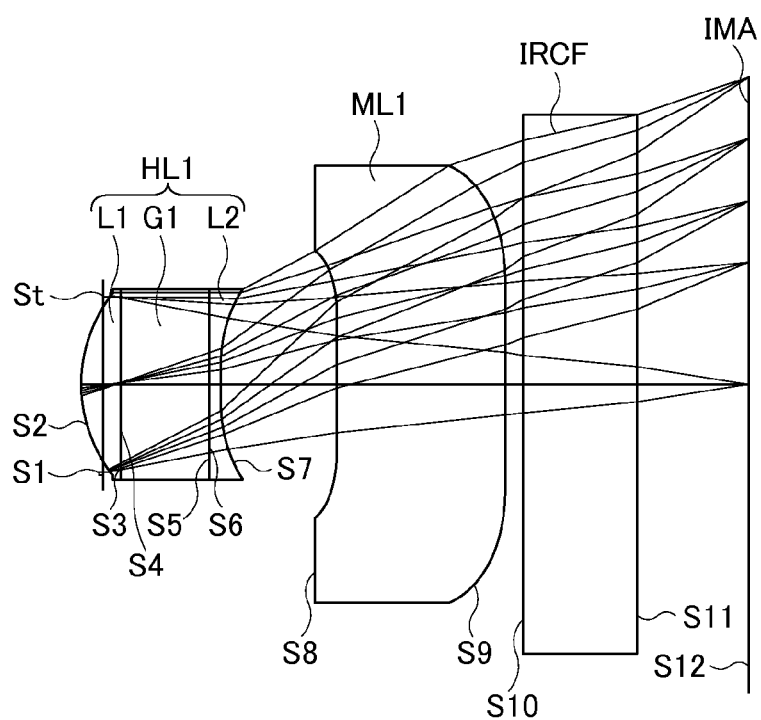
FIG. 7 is an optical path diagram of an imaging lens unit according to Example 2.

FIG. 7 is a constitution diagram of a lens unit according to Example 2. An aperture stop St; a first junction type compound lens unit HL1 being constituted of a first resin lens L1, a first plane parallel glass plate G1, and a second resin lens L2; a first single lens ML1; an infrared cut filter IRCF; and an image sensing element IMA are successively arranged in that order from the object side.

FIGS. 8A and 8B show design data of this example.

The lens data of this example showed in FIGS. 8A and 8B are as below:
FOCAL LENGTH f=1.542 mm
LENS TOTAL LENGTH TL=1.778 mm
F-NUMBER F=3.0
SENSOR DIAGONAL LENGTH IH=1.8 mm
DIAGONAL ANGLE OF VIEW(FOV)=60.4°

The angle of view FOV is an angle as wide as 60° or larger, and the F-number is F=3. Hence, the lens unit has a sufficient brightness as a fixed-focus small imaging lens. Further, the lens total length TL is smaller than the sensor diagonal length IH. Hence, the lens unit has a very small height. Also, since the lens unit has a sufficient back focus bf, even though the unit has the small height, the infrared cut filter IRCF of 0.3 mm can be inserted with respect to the image sensing element.

In this example, the first resin lens L1 uses a UV-curable resin with a refractive index of 1.513 and an Abbe number of 53, the second resin lens L2 uses a UV-curable resin with a refractive index of 1.602 and an Abbe number of 28, and the plane parallel glass plate G1 uses N-BAK4 with a refractive index of 1.568 and an Abbe number of 55.98 manufactured by SHOTT AG. The resin lenses and the plane parallel glass plate are arranged so that the refractive index successively increases from the object side, and satisfy Expressions (1) to (6) and (8) (see FIG. 15). Further, the first single lens ML1 formed of thermosetting resin is arranged behind the first junction type compound lens unit.

Figure 9C:
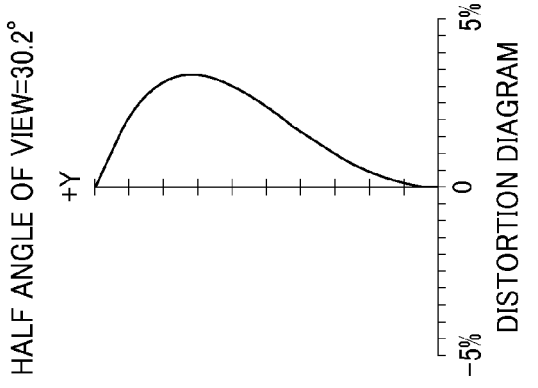
FIGS. 9A to 9C provide aberration diagrams of vertical spherical aberration, astigmatism, and distortion of Example 2.
Figure 9B:
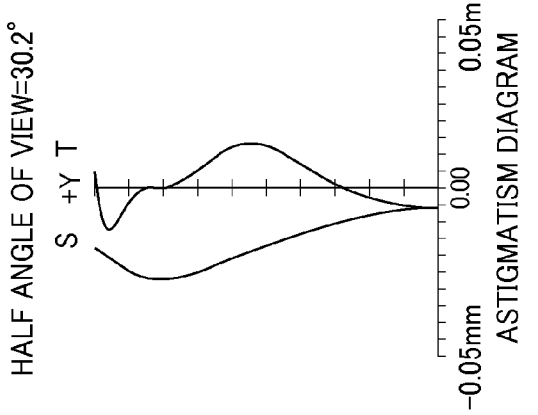
Figure 9A:
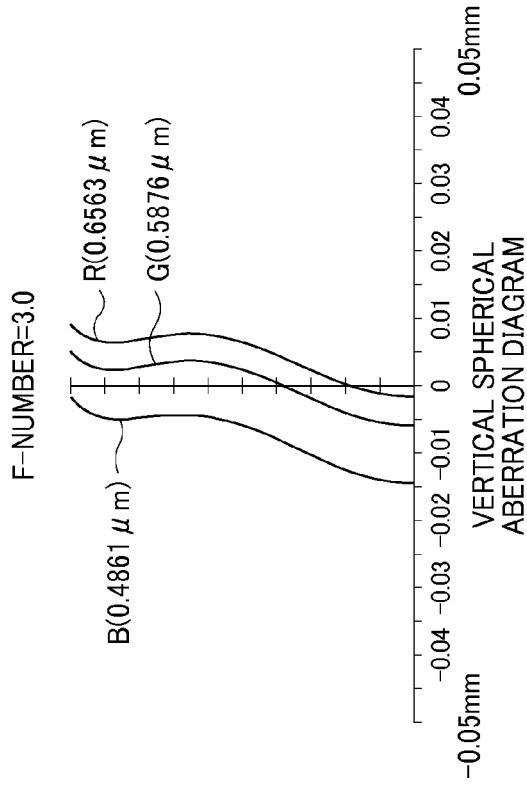

FIGS. 9A to 9C provide aberration diagrams of vertical spherical aberration, astigmatism, and distortion of this example. The spherical aberration in the entrance pupil is within 0.02 mm, the astigmatism in the imaging angle of view is within 0.05 mm, and the distortion is within 4%. Hence, it is found that the aberrations are sufficiently corrected as a lens constituted by two units.

Figure 10:
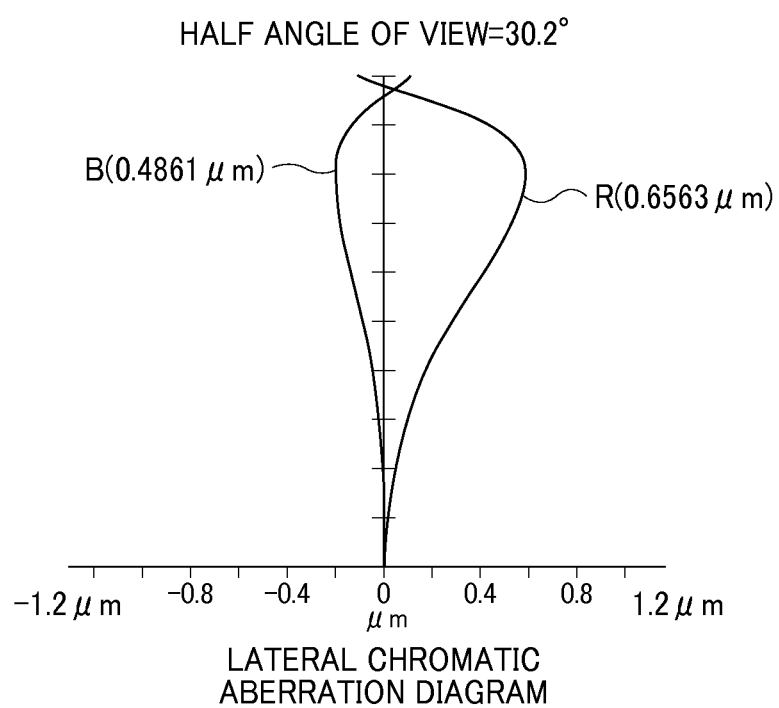
FIG. 10 is an aberration diagram of lateral chromatic aberration of Example 2.

Also, FIG. 10 is an aberration diagram of lateral chromatic aberration of this example. In this example, the chromatic aberration is corrected by using the difference in Abbe number in the junction type compound lens unit HL1. The illustrated colors and wavelengths are red with 0.6563 μm, green with 0.5876 μm, and blue with 0.4861 μm. The drawing shows shifts of image formation points with respect to the imaging angles of view with the wavelengths of blue and red, with reference to the imaging angle of view with the wavelength of green. In this example, the shifts of blue and red each are within 1 μm in the entire imaging angle of view, and hence the lateral chromatic aberration is sufficiently corrected. Further, the difference between the axial chromatic aberration with the wavelength of blue and that of red is within 15 μm, and hence the axial chromatic aberration is sufficiently corrected. Therefore, color blurring of an image that is obtained from the image sensing element is not generated, and hence an image with a good contrast can be obtained.

Example 3

Figure 11:
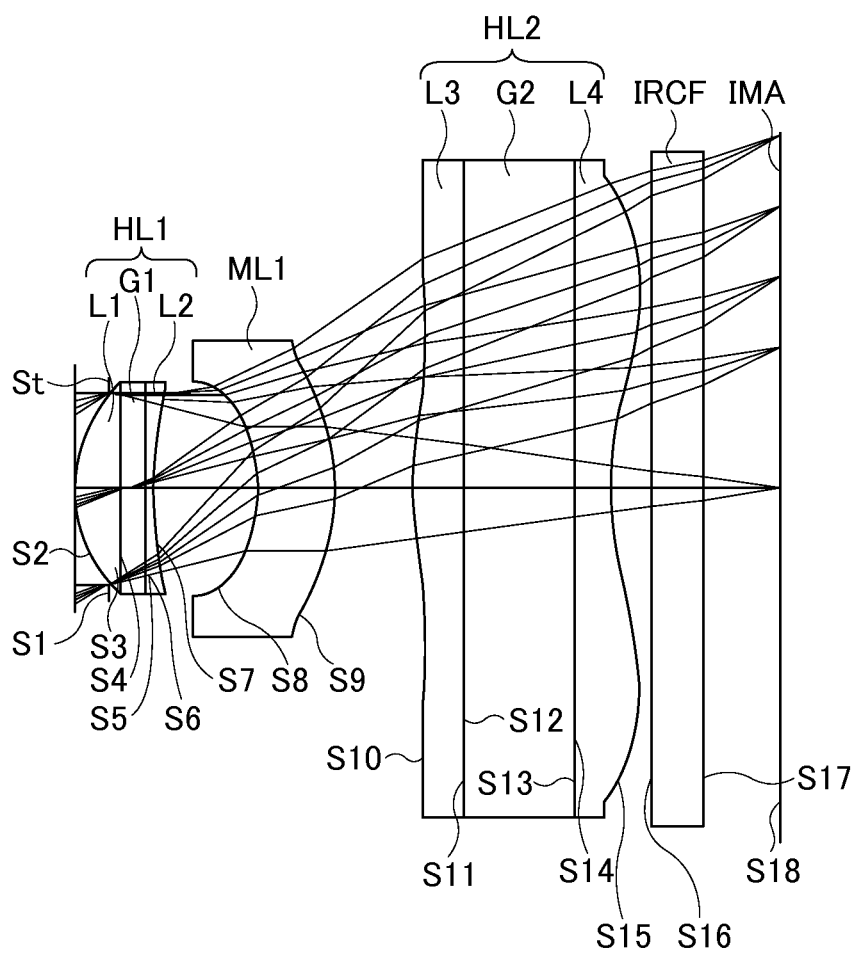
FIG. 11 is an optical path diagram of an imaging lens unit according to Example 3.

FIG. 11 is a constitution diagram of a lens unit according to Example 3. An aperture stop St; a first junction type compound lens unit HL1 being constituted of a first resin lens L1, a first plane parallel glass plate G1, and a second resin lens L2; a first single lens ML1; a second junction type compound lens unit HL2 being constituted of a third resin lens L3, a second plane parallel glass plate G2, and a fourth resin lens L4; an infrared cut filter IRCF; and an image sensing element IMA are successively arranged in that order from the object side.

FIGS. 12A and 12B show design data of this example.

The lens data of this example showed in FIGS. 12A and 12B are as below:

FOCAL LENGTH f=3.502 mm
LENS TOTAL LENGTH TL=4.101 mm
F-NUMBER F=2.8
SENSOR DIAGONAL LENGTH IH=4.48 mm
DIAGONAL ANGLE OF VIEW(FOV)=65.2°

The angle of view FOV is an angle as wide as 65° or larger, and the F-number is F=2.8. Hence, the lens unit has a sufficient brightness as a fixed-focus small imaging lens. Further, the lens total length TL is smaller than the sensor diagonal length IH. Hence, the lens unit has a very small height. Also, since the lens unit has a sufficient back focus bf, even though the unit has the small height, the infrared cut filter IRCF of 0.3 mm can be inserted with respect to the image sensing element. Also, although the first plane parallel glass plate G1 has a thickness of 0.15 mm and hence is very thin, the thin first parallel glass plate G1 can form a junction type compound lens without any problem if the first parallel glass plate G1 is an individual piece of glass.

In this example, for the materials constituting the first junction type compound lens unit HL1, the first resin lens L1 uses a UV-curable resin with a refractive index of 1.513 and an Abbe number of 53, the second resin lens L2 uses a UV-curable resin with a refractive index of 1.625 and an Abbe number of 23.5, and the first plane parallel glass plate G1 uses N-BAK4 with a refractive index of 1.568 and an Abbe number of 55.98 manufactured by SHOTT AG. Also, for the materials constituting the second junction type compound lens unit HL2, the third resin lens L3 uses a UV-curable resin with a refractive index of 1.47 and an Abbe number of 54.7, the fourth resin lens L4 uses a UV-curable resin with a refractive index of 1.526 and an Abbe number of 54, and the second plane parallel glass plate G2 uses N-BK7 with a refractive index of 1.5168 and an Abbe number of 64.16 manufactured by SHOTT AG. The first single lens ML1 uses a UV-curable resin with a refractive index of 1.602 and an Abbe number of 28.

The resin lenses and the plane parallel glass plate of the first junction type compound lens unit HL1 are arranged so that the refractive index successively increases from the object side, and satisfy Expressions (1) to (8). Also, the resin lenses and the plane parallel glass plate of the second junction type compound lens unit HL2 are arranged so that the refractive index successively increases from the object side, and satisfy Expressions (1) to (6) and (8) (see FIG. 15). The first single lens ML1 formed of the UV-curable resin is arranged between the first junction type compound lens unit HL1 and the second junction type compound lens unit HL2.

FIGS. 13A to 13C provide aberration diagrams of vertical spherical aberration, astigmatism, and distortion of this example. The spherical aberration in the entrance pupil is within 0.05 mm, the astigmatism in the imaging angle of view is within 0.1 mm, and the distortion is within 1%. Hence, the aberrations are sufficiently corrected as a lens constituted by three units.

Figure 14:
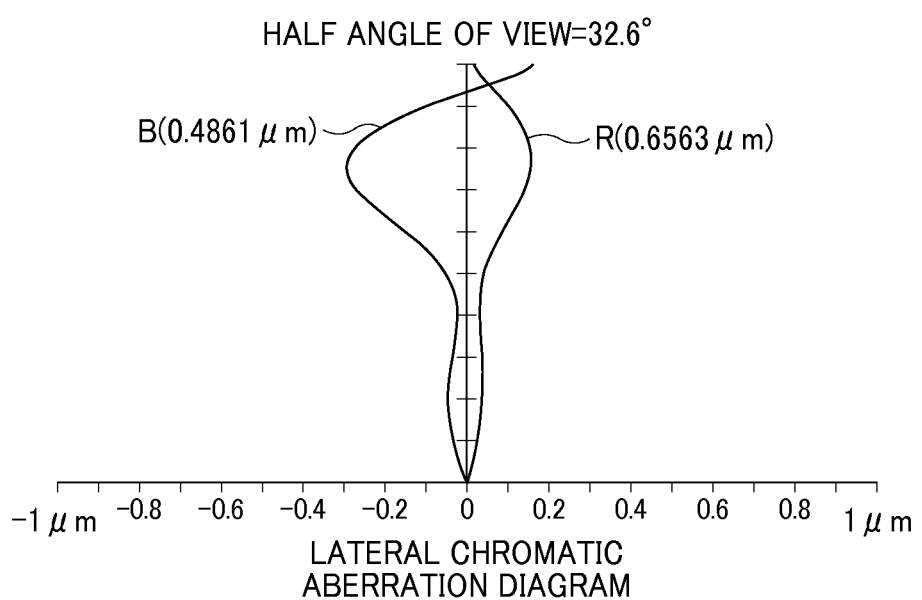
FIG. 14 is an aberration diagram of lateral chromatic aberration of Example 3.

Also, FIG. 14 is an aberration diagram of lateral chromatic aberration of this example. In general, the chromatic aberration of three-unit lenses is corrected by using a material with a small Abbe number for a lens in a second unit. However, in this example, the chromatic aberration is corrected even in the first junction type compound lens unit HL1. The shift between the blue and red in the entire imaging angle of view is within 0.5 μm, and hence the chromatic aberration is highly sufficiently corrected, as compared with the general three-unit constitution. Therefore, color blurring of an image that is obtained from the image sensing element is not generated, and hence an image with a very good contrast can be obtained.

As described above, if the imaging lens suggested by any of the embodiment and examples of the present invention is used, even if a ray with a large angle is incident on the imaging lens, an optical defect, such as a flare or a ghost image, is hardly generated, various aberrations, which may deteriorate optical performance, are sufficiently corrected, and hence a small and high-performance lens system can be provided.

What is claimed is:

1. An imaging lens comprising:
   at least one lens unit including
      a junction type compound lens having
         a plane parallel glass plate formed of optical glass,
         an object side resin lens formed of energy-curable resin, bonded to an object side surface of the plane parallel glass plate and being a planoconvex lens with a convex surface facing the object side having a positive refractive power, and
         an image side resin lens formed of energy-curable resin, bonded to an image side surface of the plane parallel glass plate and being a planoconcave lens with a concave surface facing the image side having a negative refractive power,
   wherein the imaging lens satisfies Expressions (1) to (8) as follows, $$N_1 \leq N_2 \leq N_3 \quad (1),$$

$$0.08 \leq N_3 - N_1 \leq 0.15 \quad (2)$$

$$0 \leq N_2 - N_1 \leq 0.1 \quad (3),$$

$$0 \leq N_3 - N_2 \leq 0.1 \quad (4),$$

$$|\upsilon_1 - \upsilon_2| \leq 30 \quad (5),$$

$$|\upsilon_2 - \upsilon_3| \leq 32.48 \quad (6),$$

$$29.5 \leq \upsilon_1 - \upsilon_3 \leq 40 \quad (7), \text{ and}$$

$$\upsilon_2 \geq 50 \quad (8),$$

where $N_1$ is a refractive index of the object side resin lens, $N_2$ is a refractive index of the plane parallel glass plate, $N_3$ is a refractive index of the image side resin lens, $\upsilon_1$ is an Abbe number of the object side resin lens, $\upsilon_2$ is an Abbe number of the plane parallel glass plate, and $\upsilon_3$ is an Abbe number of the image side resin lens.

2. The imaging lens according to claim 1, wherein the plane parallel glass plate used for the lens unit is an individual piece of glass cut before the resin lenses are formed.

3. The imaging lens according to claim 1, wherein the resin lenses in the lens unit have curved surfaces that are aspherical surfaces.

4. The imaging lens according to claim 1, wherein an evaporated film for shielding a ray with a specific wavelength is formed on at least one of the surfaces of the plane parallel glass plate.

* * * * *